United States Patent
Klusman et al.

(10) Patent No.: US 8,202,003 B2
(45) Date of Patent: Jun. 19, 2012

(54) COMPLIANT SPHERICAL BEARING MOUNT

(75) Inventors: Steven Arlen Klusman, Indianapolis, IN (US); Preston Earl Light, Fishers, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 438 days.

(21) Appl. No.: 12/387,163

(22) Filed: Apr. 29, 2009

(65) Prior Publication Data

US 2010/0278465 A1    Nov. 4, 2010

(51) Int. Cl.
*F16C 32/06* (2006.01)

(52) U.S. Cl. ........ 384/106; 384/124; 384/581; 384/536; 384/99

(58) Field of Classification Search .............. 384/99, 384/103, 106, 119, 124, 535, 536, 581
See application file for complete search history.

(56) References Cited

U.S. PATENT DOCUMENTS

| | | | |
|---|---|---|---|
| 2,137,487 A | 3/1936 | Hall | |
| 2,683,636 A | 11/1949 | Wilcox | |
| 3,884,534 A * | 5/1975 | Winn | 384/106 |
| 4,808,070 A | 2/1989 | Fonda-Bonardi | |
| 4,865,466 A * | 9/1989 | Jones | 384/103 |
| 5,017,022 A * | 5/1991 | Ruggles et al. | 384/100 |
| 5,102,236 A | 4/1992 | Ide | |
| 5,201,585 A | 4/1993 | Gans et al. | |
| 5,205,652 A | 4/1993 | Chapman | |
| 5,284,392 A | 2/1994 | Ide | |
| 5,634,723 A * | 6/1997 | Agrawal | 384/106 |
| 6,450,688 B2 | 9/2002 | Matsushima | |
| 7,614,792 B2 * | 11/2009 | Wade et al. | 384/104 |
| 2001/0053329 A1 | 12/2001 | Fledersbacher et al. | |
| 2003/0190099 A1 | 10/2003 | Alam et al. | |
| 2004/0042693 A1* | 3/2004 | Dubreuil et al. | 384/106 |

* cited by examiner

*Primary Examiner* — Patrick Mackey
(74) *Attorney, Agent, or Firm* — Krieg DeVault LLP

(57) ABSTRACT

A gas turbine engine bearing assembly for a portion of a shaft that rotates around an axis, including a substantially cylindrical bearing having a length extending between a first end and a second end along the axis of the rotating shaft. A plurality of segmented damper springs are positioned around an exterior perimeter of a portion of the cylindrical bearing. Each spring has a width along the axis of the rotating shaft and a portion of each spring defines an outer spherically contoured joint. The width of each spring is less than the length of the bearing.

18 Claims, 6 Drawing Sheets

COMPLIANT SPHERICAL BEARING MOUNT

GOVERNMENT RIGHTS

The present application was made with the United States government support under Contract No. N00014-04-D-0068, awarded by the U.S. Navy. The United States government has certain rights in the present application.

BACKGROUND

The present inventions relates generally to supporting a rotating shaft in, for example, a gas turbine engine, and more particularly, but not exclusively, to a bearing mounting assembly for supporting a shaft including damper springs surrounding the bearing mounting assembly. Although the present inventions were developed for use in gas turbine engines, certain applications may be outside this field.

Presently many systems for supporting shafts in gas turbine engines suffer from a number of disadvantages, limitations, and drawbacks including, for example, those respecting sufficient compliance to handle thermal deflections; bearing sizes; and misalignment of the shafts. Thus, there is a continuing need for the development of technology for supporting shafts within a gas turbine engine. The present inventions satisfy this need in a novel and unobvious way.

SUMMARY

In one embodiment of the present invention there is a gas turbine engine bearing assembly for a portion of a shaft that rotates around an axis. The bearing assembly includes a substantially cylindrical bearing having a length extending between a first end and a second end along the axis of the rotating shaft. The bearing assembly also includes a plurality of segmented damper springs positioned around an exterior perimeter of a portion of the cylindrical bearing. Each spring has a width along the axis of the rotating shaft and a portion of each spring defines an outer spherically contoured joint. The width of each spring is less than the length of the bearing.

In one refinement of the embodiment, the bearing is a foil air bearing, and the outer spherically contoured joint of each spring is between a pair of inner mutes.

In another refinement of the embodiment there is also a bearing housing, wherein the spherically contoured joint is preloaded within the bearing housing.

In another refinement of the embodiment, the cylindrical bearing is a foil bearing, and an interior of the bearing at both the first end and the second end includes a plurality of segmented snubbers.

In another refinement of the embodiment, the bearing is a foil air bearing, and the outer spherically contoured joint of each spring is between a pair of inner mutes.

In another refinement of the embodiment, the spherically contoured joint has a spherical radius of about 1.95 inches and a radial depth of about 0.009 inches and has a preload of about 0.002 inches. The cylindrical bearing has a length of about 4 inches and an outer diameter of about 3.5 inches. The bearing housing has an inner diameter of about 3.76 inches.

In another embodiment of the present invention a bearing assembly for a gas turbine engine includes a plurality of curved spring bars forming a substantially circular array around a portion of an exterior of a bearing sleeve. Each spring bar has an outer mute that defines an external spherically contoured joint.

In one refinement the bearing sleeve is a foil air bearing sleeve.

In another refinement of the embodiment the assembly further includes a bearing housing, wherein the spherically contoured joint is preloaded within the bearing housing.

In another refinement of the embodiment the bearing housing has a corresponding spherical cavity for each of the plurality of spherical joints.

In another refinement of the embodiment an interior of the bearing sleeve extends between a first end and a second end. The interior at both the first end and the second end includes a retainer ring substantially adjacent a plurality of segmented snubbers.

In another refinement of the embodiment the spherically contoured joint extends across an entire width of the spring bar. Each spring bar further includes an inner mute at each end with the outer mute being between the two inner mutes.

In another embodiment of the present invention a gas turbine engine bearing assembly for use with a shaft rotating around an axis, includes a substantially cylindrical foil bearing. A circumferential exterior portion of the foil bearing is within a substantially circular array of curved spring bars with each spring bar including an external spherically contoured protrusion.

One refinement of the embodiment includes a bearing housing having a plurality of spherically contoured cavities. Each spherically contoured cavity is associated with a corresponding spherically contoured protrusion.

Another refinement of the embodiment is the foil bearing which has a length of about 4 inches and an outer diameter of about 3.5 inches. The bearing housing has an inner diameter of about 3.76 inches, and each spring bar has a width of about 0.9 inches.

Another refinement of the embodiment includes a bearing housing, wherein the spherically contoured protrusion is a self-aligning mount, and the spherical mount is preloaded within the bearing housing.

Another refinement of the embodiment is a spherically contoured protrusion which has a spherical radius of about 1.95 inches and a radial depth of about 0.009 inches. The spherical mount has a preload of about 0.002 inches.

Another refinement of the embodiment is a foil bearing which is a foil air bearing. An interior of at least one end of the bearing includes a retainer ring substantially adjacent a plurality of segmented snubbers.

In another refinement of the embodiment seven curved spring bars substantially encircle the circumferential exterior portion of the foil bearing.

In another refinement of the embodiment the spring bars each have a width along the axis. The spherically contoured protrusion of each spring bar extends across the width of the spring bar.

One form of the present invention contemplates a unique bearing assembly for supporting a shaft within a gas turbine engine. Other forms of the present invention contemplate unique apparatuses, systems, devices, hardware, methods, and combinations of these for defining a bearing assembly for a gas turbine engine. Further embodiments, forms, objects, features and aspects of the present inventions shall become apparent from the following description and drawings.

DESCRIPTION OF THE ILLUSTRATIVE EMBODIMENTS

Figure 1:
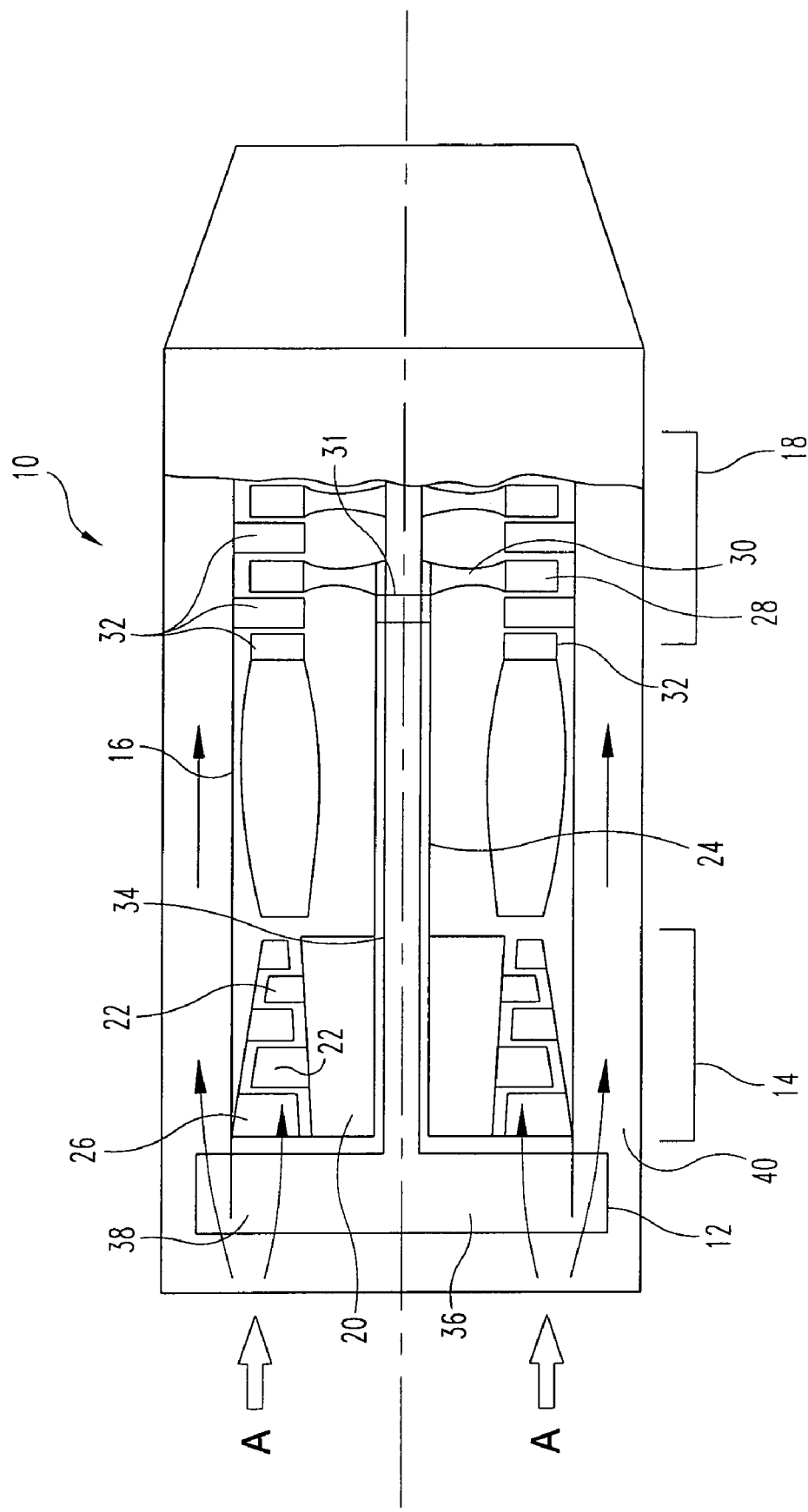
FIG. 1 is an illustrative schematic view of a gas turbine engine.

For the purposes of promoting an understanding of the principles of the inventions, reference will now be made to the embodiment illustrated in the drawings and specific language will be used to describe the same. It will nevertheless be understood that no limitation of the scope of the inventions is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a schematic representation of an illustrative gas turbine engine 10, which includes a fan section 12, a compressor section 14, a combustor section 16, and a turbine section 18 that are integrated together to provide an aircraft flight propulsion engine. This type of gas turbine engine is generally referred to as a turbofan. A person of ordinary skill in the art should realize that there are multitudes of ways in which the gas turbine engine components can be linked together. The present invention is applicable to all types of gas turbine engines and is not intended to be limited herein to an engine similar to that shown in the schematic of FIG. 1 unless specifically provided to the contrary. Further, the term aircraft is generic and includes, but is not limited to, helicopters, airplanes, missiles, unmanned space devices and any other substantially similar devices.

Compressor section 14 includes a rotor 20 having a plurality of compressor blades 22 coupled thereto. The rotor 20 is affixed to a shaft 24 that is rotatable within the gas turbine engine 10. A plurality of compressor vanes 26 are positioned within the compressor section 14 to direct the fluid flow relative to compressor blades 22. Turbine section 18 includes a plurality of turbine blades 28 that are coupled to a rotor disk 30. Rotor disk 30 is affixed to the shaft 24, which is rotatable within the gas turbine engine 10. Energy extracted in the turbine section 18 from the hot gas exiting the combustor section 16 is transmitted through shaft 24 to drive the compressor section 14. The shaft 24 is supported by at least one bearing assembly 31. Further, a plurality of turbine vanes 32 are positioned within the turbine section 18 to direct the hot gaseous flow stream exiting the combustor section 16.

Turbine section 18 also provides power to a fan shaft 34, which drives the fan section 12. Fan section 12 includes a fan 36 having a plurality of fan blades 38 extending therefrom. Air enters the gas turbine engine 10 in the general direction of arrows A and passes through the fan section 12 into the compressor section 14 and a bypass duct 40. While the present disclosure will be with reference to a bearing assembly in the turbine section, it is contemplated that forms of the present invention will be applicable to other bearing assemblies in other sections in the gas turbine engine including, but not limited to, the compressor section and the fan section. Additionally, any number of bearing assemblies could be utilized within the gas turbine engine.

Figure 2:
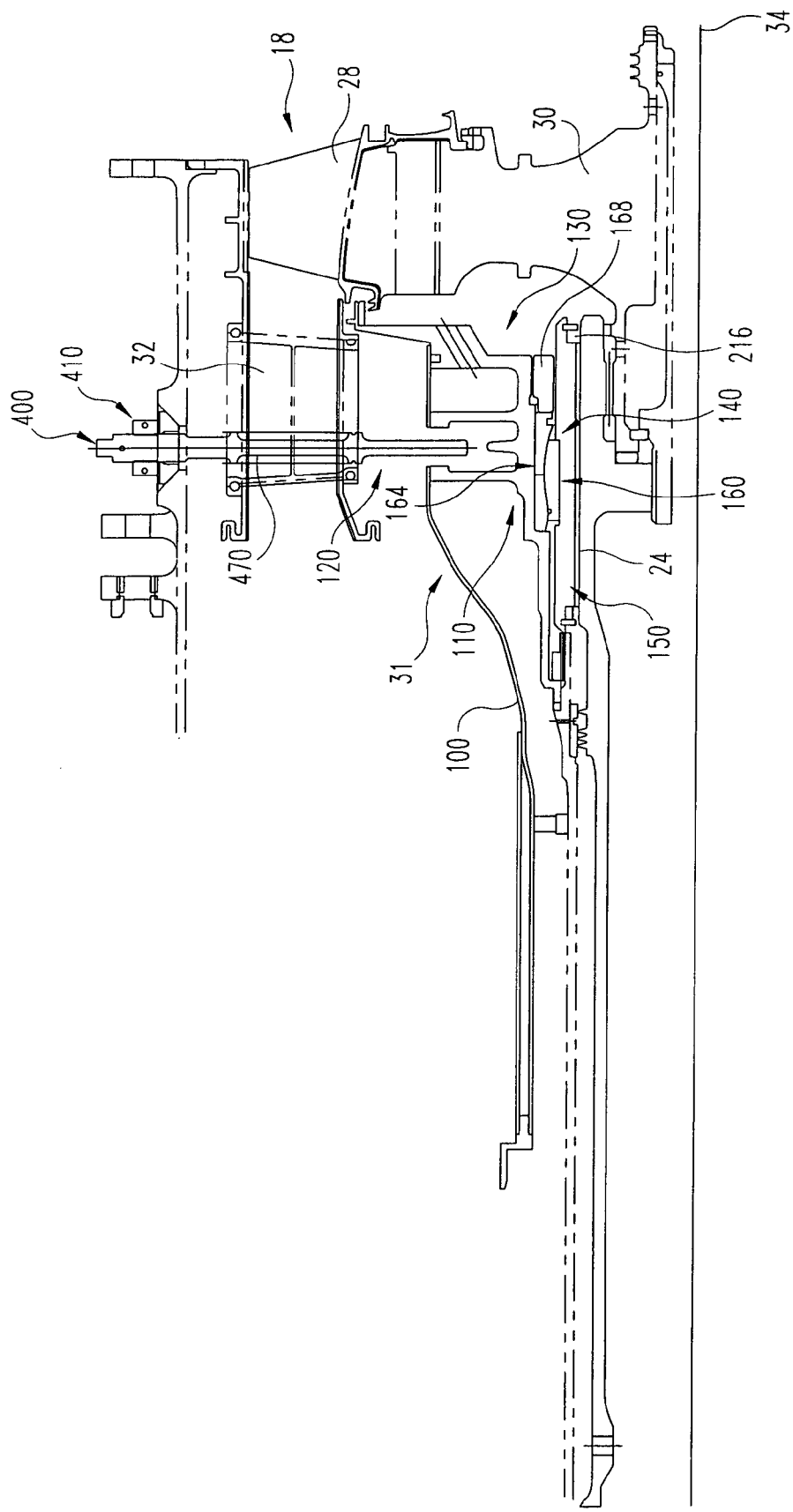
FIG. 2 is a partial cross-sectional view of a gas turbine engine according to an embodiment of the present invention.
Figure 3:
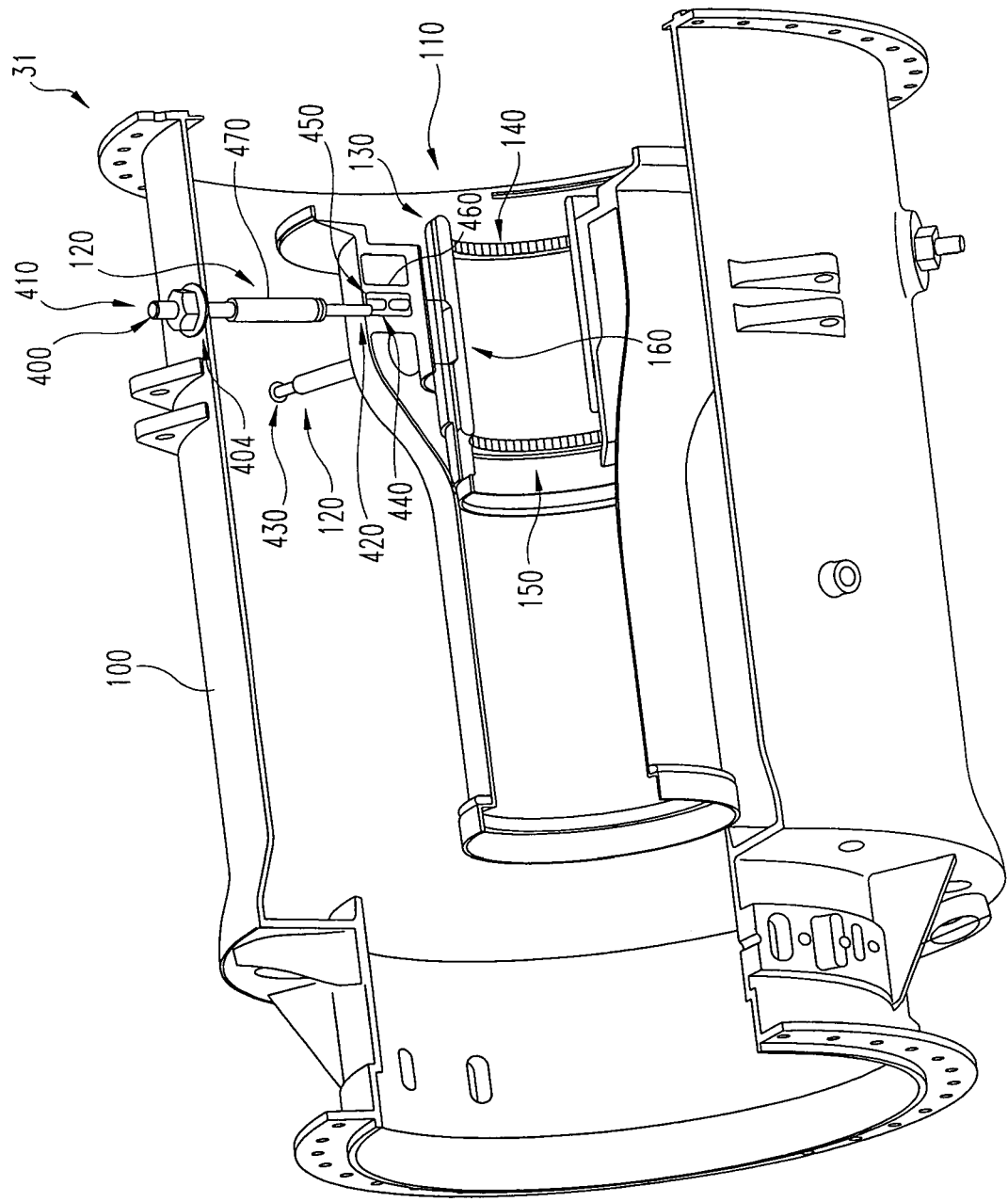
FIG. 3 is a cut-away perspective view of a bearing assembly and housing according to an embodiment of the present invention.

Referring now to FIGS. 2 and 3, the bearing assembly 31 includes an outer housing 100 supporting an inner bearing assembly 110 with a plurality of support assemblies 120. In one form of the present invention, the inner bearing assembly 110 includes an inner housing 130 and an air bearing assembly 140. The air bearing assembly 140 includes an air bearing 150 and a plurality of damper springs or spring bar isolators 160. The plurality of damper springs 160 interact with bearing housing 164 to provide a self-aligning joint. The self-aligning joint protects the air bearing 150 and/or assembly 140 from misalignment and transient overloads from the shaft 24. A spanner nut 168 retains the air bearing assembly 140 to the shaft 24 within the inner housing 130. In one form of the present invention, the bearing housing 164 is integral with the inner housing 130. In another form of the present invention, the bearing housing 164 is separate from the inner housing and frictionally engages the damper springs 160 and the inner housing 130. Air bearing 150 is preferably a foil air bearing.

Figure 4:
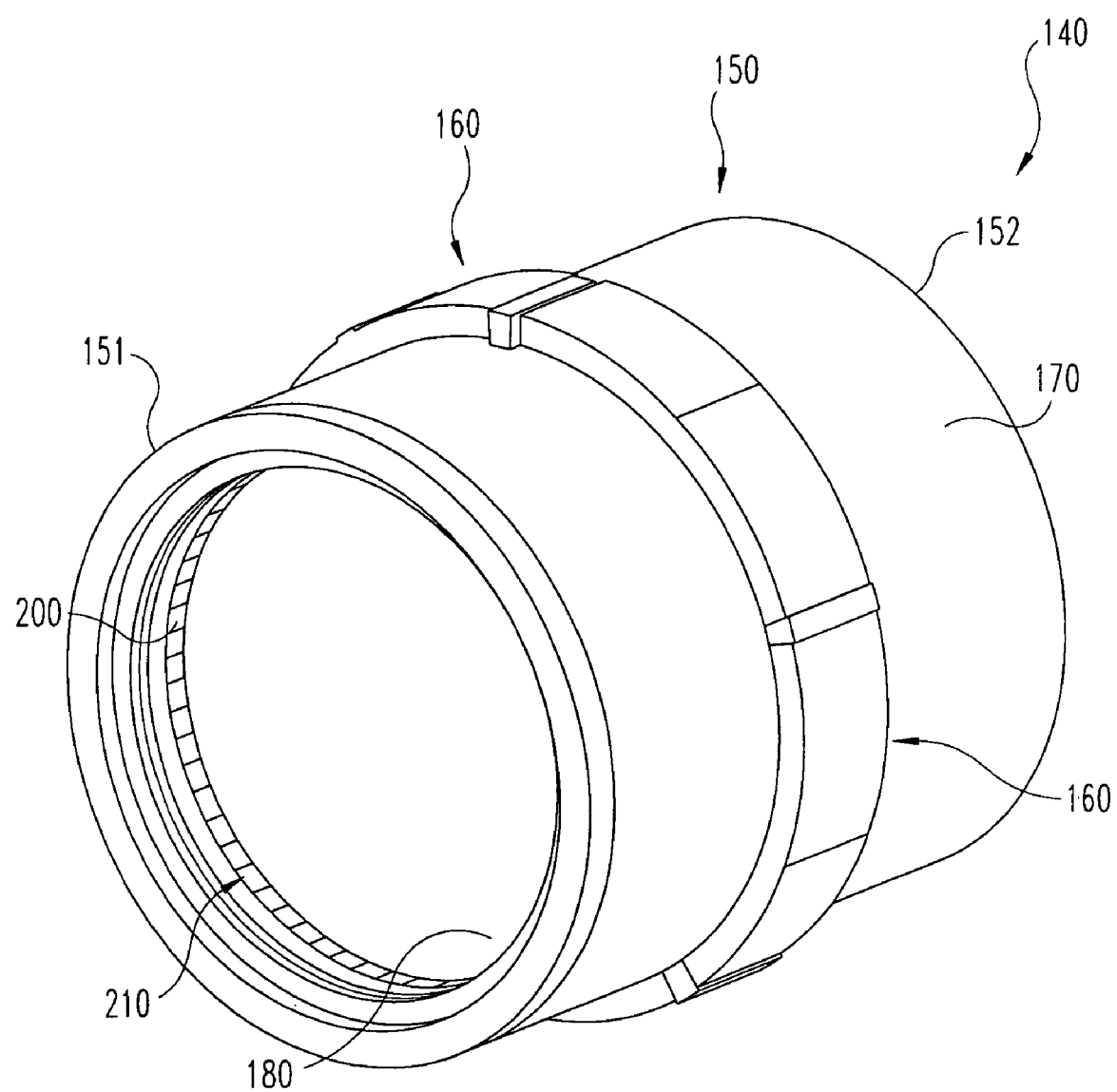
FIG. 4 is a perspective view of an air bearing assembly according to an embodiment of the present invention.

As shown in FIG. 4, the air bearing 150 includes an outer bearing surface 170 and an inner bearing surface 180. The inner surface 180 of air bearing 150 extends around the circumference of the shaft 24. As the shaft 24 rotates at low speeds, the shaft 24 aligns with the air bearing 150 such that even contact occurs between the shaft 24 and air bearing 150. In one form of the present invention a plurality of snubbers 200 are provided along a groove 210 at each end of the bearing 150. The snubbers 200 and the groove 210 are preferably formed such that they form a segmented and grooved ring for thermal expansion and air flow through the bearing assembly 140. A retaining ring 216 (see FIG. 7) is provided to retain the snubbers 200 within the groove 210. In one form of the present invention, the snubbers 200 are formed from graphalloy. The plurality of spring bars 160 are preferably provided along the outer bearing surface 170 at approximately the middle of the air bearing 150. In one form of the present invention, the plurality of damper springs 160 might provide the ability to accept relative thermal expansion of the mating parts while providing the stiffness needed for acceptable dynamics.

In one form of the present invention, the air bearing 150 is a standard foil air bearing about 4 inches in length between ends 151, 152 and having a bearing outer diameter of about 3.5 inches. The corresponding bearing housing preferably having an inner diameter of about 3.76 inches (and preferably including a plurality of corresponding spherical cavities that match the spherical protrusions on the spring bars). Each of the plurality of damper springs 160 preferably have a width of about 0.9 inches. In one form of the present invention, the plurality of damper springs 160 each have a max bending stress of about 11 ksi/mil. In one form of the present invention, a substantially circular array of seven curved spring bars 160 span the perimeter of at least a portion of the outer bearing surface 170 with a total of 200,000 pound per inch of stiffness. In another form of the present invention, four damper springs 160 substantially enclose the outer bearing surface 170. However, other air bearing sizes are fully contemplated herein.

Figure 5:
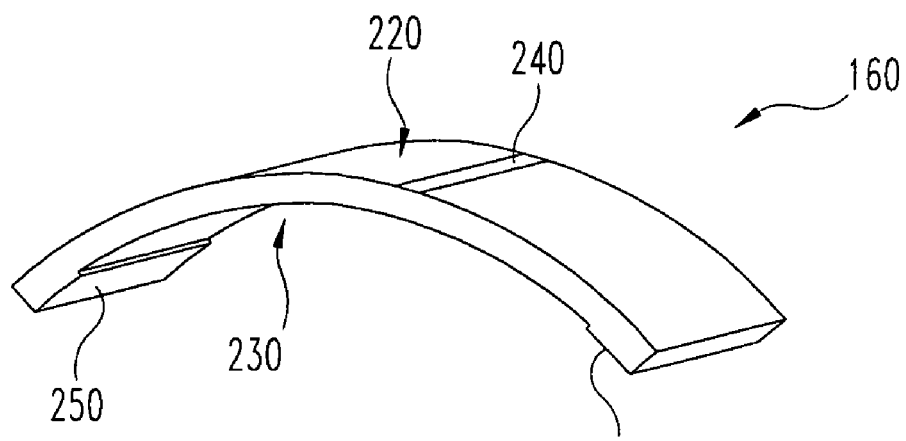
FIG. 5 is a perspective view showing a damper spring according to an embodiment of the present invention.
Figure 6:
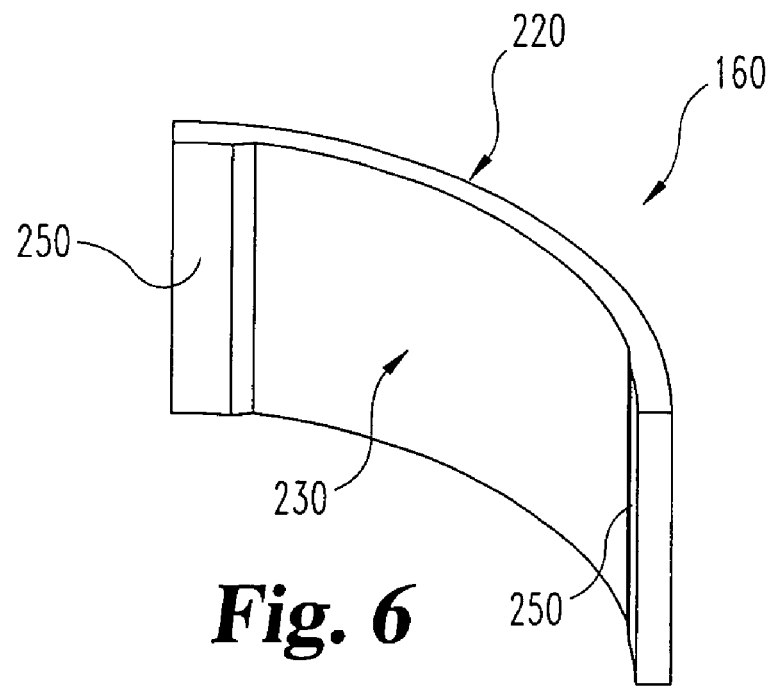
FIG. 6 is a perspective view showing a different view of the damper spring of FIG. 5.

Referring to FIGS. 5 and 6, each damper spring 160 includes an outer surface 220 and an inner surface 230. The outer surface 220 is operable to contact at least a portion of the housing 164. The inner surface 230 is operable to contact the outer bearing surface 170. Each damper spring 160 preferably includes a spherically contoured outer mute 240 between a pair of inner mutes 250. In one form of the present invention, each of the inner mute 250 and the outer mute 240 have a depth of about 0.009 inches. The outer mute 240 is spherically contoured to allow angular deflections with a low transmitted moment to the housing. In one form of the present invention, the outer mute 240 has a spherical radius of about 1.95 inches and preferably extends across the entire width of the damper spring 160. However, other sizes are fully contemplated herein.

Various embodiments of the present invention preferably provide a uniform loading profile the length of the air bearing 150. Misalignment can load up one half of the bearing (off load the other half) to delay liftoff in gas turbine engine applications. In one form of the present invention, the spherical joint of at least one of the plurality of damper springs 160 is preloaded in bearing housing 164 with a 0.002 inch preload to align the air bearing 150 for engine start up. About 70 inch-pounds or more of moment from the shaft 24 is needed to overcome the preload (assuming a coefficient of friction of about 0.05). In one form of the present invention, dynamic loads are not expected to overcome the preload and the plurality of damper springs 160 (and associated spherical mounts) are primarily provided for assembly alignment. In another form of the present invention, the preload is overcome after the engine reaches a second operating condition after start up. The radial load at the spherical mount from preload is 115 lbf./spring (this assumes a 0.002 inch radial preload and assumes the total radial stiffness acts against ½ the springs). The damper springs 160 preferably have a relatively low stiffness to provide manageable loads at the sliding spherical joint. The bearing preferably swivels in the spherical joint dynamically and preferably has a coefficient of friction less than 0.4. The foil air bearing preferably has a load capacity that is adequate to handle break away loads.

In one form of the present invention the self-aligning spherical mounting has the compliance to handle relative thermal deflections in the hot environment of a gas turbine engine. This allows the compliant foil bearing (about 4 inches long in one form) to align with the shaft while it is rotating and transmit a radial load without a moment to the housing. The individual curved spring bars provide the ability to accept relative thermal expansion of the mating parts while providing the stiffness needed for acceptable dynamics. The outer mute in contact with the bearing housing is spherically contoured to allow angular deflections with low transmitted moment. This provides a uniform loading profile the length of the foil air bearing. Applications of various aspects of the present invention allow air bearings to become larger and be able to accept the thermal environment and misalignment expected in a gas turbine engine. The bearing, which spans the shaft for several inches, can operate as if it were centrally located in much the same way as a rolling element bearing. The bearing loads are preferably uniformly applied to maximize total load capacity. The foil bearing housing is also free to grow thermally without distortion or with minimal distortion.

Referring back to FIG. 3, the plurality of support assemblies 120 support the inner bearing assembly 110 within the outer housing 100. Each of the plurality of support assemblies 120 includes a STROD member 400 and a fastener 404. Each STROD member 400 includes an upper end 410 and a lower end 420. The upper end 410 extends through an opening 430 in the outer housing 100 and is secured to the outer housing 100 with the fastener 404. In one form of the present invention, the upper end 410 includes a threaded portion (not shown) operable to receive the fastener 404. The lower end 420 includes a channel member 440 received within a channel 450 in a support member 460 of the inner housing 130. In one form of the present invention, the STROD member 400 includes a heat shield 470 which is operable to provide thermal protection to the STROD member 400 from hot engine gases.

Figure 7:
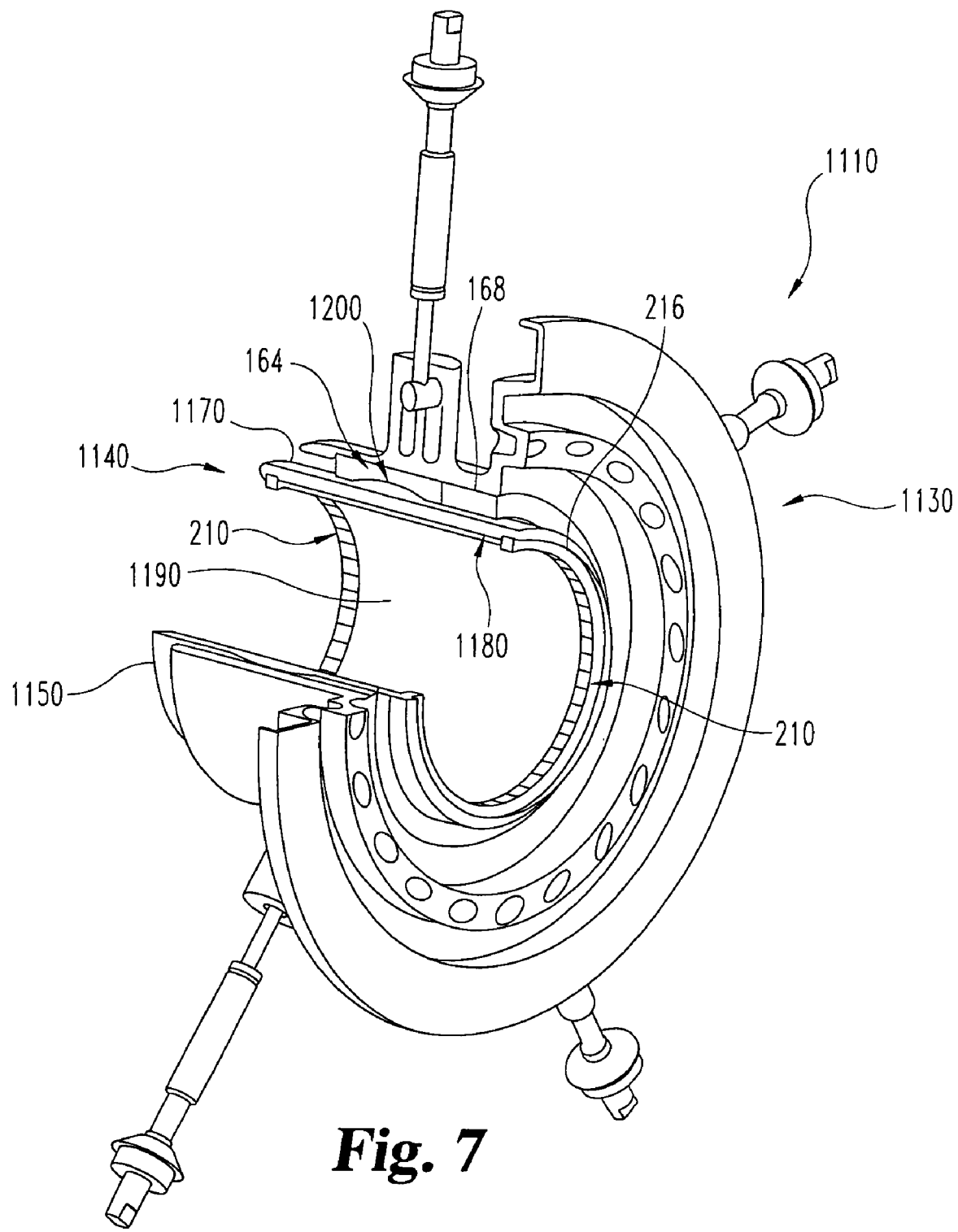
FIG. 7 is a cut-away perspective view of an inner bearing assembly according to an embodiment of the present invention.

Referring now to FIG. 7, there is shown another embodiment of a bearing assembly 1110. The same reference numbers are used for the same elements as described above. The bearing assembly 1110 includes an inner housing 1130 and an air bearing assembly 1140. The air bearing assembly 1140 includes an air bearing 1150 having an outer bearing surface 1170 and an inner bearing surface 1180. The outer bearing surface 1170 includes an integral spherical joint 1200. The integral spherical joint 1200 and the bearing housing 164 provide a self-aligning joint to protect the air bearing 1150 from misalignment of the shaft 24 and any transient overloads which may be caused by the rotation of the shaft 24. The integral spherical joint 1200 is provided along the outer bearing surface 1170 at approximately the middle of the air bearing 1150. The spherical joint 1200 provides the ability to accept relative thermal expansion of the mating parts while providing the stiffness needed for acceptable dynamics. The spherical joint 1200 is spherically contoured to allow angular deflections with a low transmitted moment to the inner housing 1130. This provides a uniform loading profile the length of the air bearing 1150. In one form of the present invention, the spherical joint 1200 provides spherical mounting allowing the air bearing 1150 to align with the shaft 24 as the shaft 24 rotates such that only a radial load without a moment to transfer to the inner housing 1130. Alternatively, it should be understood that spherical joint 1200 might instead be formed on a plurality of curved spring bars that encircle a portion of the air bearing 1150, the curved spring bars being separate from the air bearing 1150.

In one embodiment, this invention provides support for a foil bearing or any bearing that is compliant and allows for relative thermal expansion. It also provides a spherical mount to allow for angular deflections and misalignment.

The present invention is preferably applied as an engine component that is used to compliantly mount a bearing in a housing for improved dynamics and for tolerance to relative thermal expansion. It is also preferably self-aligning so the bearing only transmits radial loads and not moments. The use of a self-aligning joint (and the presence of the snubbers) help protect the air bearing from misalignment and transient overloads.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine bearing assembly for a portion of a shaft that rotates around an axis, comprising:
    a substantially cylindrical bearing having a length extending between a first end and a second end along the axis of the rotating shaft;
    a plurality of segmented damper springs positioned around an exterior perimeter of a portion of the cylindrical bearing, wherein each spring has a width along the axis of the rotating shaft and a portion of each spring defines an outer spherically contoured joint;
    wherein the width of each spring is less than the length of the bearing; and
    wherein the bearing is a foil air bearing, and wherein the outer spherically contoured joint of each spring is between a pair of inner mutes.

2. The bearing assembly of claim 1, further comprising a bearing housing, wherein the spherically contoured joint is preloaded within the bearing housing.

3. A gas turbine engine bearing assembly for a portion of a shaft that rotates around an axis, comprising:
    a bearing housing:
    a substantially cylindrical bearing having a length extending between a first end and a second end along the axis of the rotating shaft;
    a plurality of segmented damper springs positioned around an exterior perimeter of a portion of the cylindrical bearing, wherein each spring has a width along the axis of the rotating shaft and a portion of each spring defines an outer spherically contoured joint that is preloaded within the bearing housing;
    wherein the width of each spring is less than the length of the bearing; and
    wherein the cylindrical bearing is a foil bearing, and wherein an interior of the bearing at both the first end and the second end includes a plurality of segmented snubbers.

4. The bearing assembly of claim 3, wherein the outer spherically contoured joint of each spring is between a pair of inner mutes.

5. The bearing assembly of claim 4, wherein the spherically contoured joint has a spherical radius of about 1.95 inches and a radial depth of about 0.009 inches and has a preload of about 0.002 inches, and wherein the cylindrical bearing has a length of about 4 inches and an outer diameter of about 3.5 inches, the bearing housing having an inner diameter of about 3.76 inches.

6. A bearing assembly for a gas turbine engine, comprising a plurality of curved spring bars forming a substantially circular array around a portion of an exterior of a foil air bearing sleeve, a bearing housing, each spring bar having an outer mute that defines an external spherically contoured joint that is preloaded within the bearing housing; and
    the bearing housing has a corresponding spherical cavity for each of the plurality of spherical joints.

7. A bearing assembly for a gas turbine engine, comprising a plurality of curved spring bars forming a substantially circular array around a portion of an exterior of a foil air bearing sleeve, each spring bar having an outer mute that defines an external spherically contoured joint; and
    wherein an interior of the bearing sleeve extends between a first end and a second end, and wherein the interior at both the first end and the second end includes a retainer ring substantially adjacent a plurality of segmented snubbers.

8. The bearing assembly of claim 7, wherein the spherically contoured joint extends across an entire width of the spring bar, and wherein each spring bar further includes an inner mute at each end, the outer mute being between the two inner mutes.

9. A gas turbine engine bearing assembly for use with a shaft rotating around an axis, comprising a substantially cylindrical foil bearing, wherein a circumferential exterior portion of the foil bearing is within a substantially circular array of curved spring bars, each spring bar including an external spherically contoured protrusion; and
    a bearing housing having a plurality of spherically contoured cavities, each spherically contoured cavity associated with a corresponding spherically contoured protrusion.

10. The bearing assembly of claim 9, wherein the foil bearing has a length of about 4 inches and an outer diameter of about 3.5 inches, the bearing housing having an inner diameter of about 3.76 inches, and wherein each spring bar has a width of about 0.9 inches.

11. The bearing assembly of claim 9, wherein the spherically contoured protrusion is a self-aligning mount, and wherein the spherical mount is preloaded within the bearing housing.

12. The bearing assembly of claim 11, wherein the spherically contoured protrusion has a spherical radius of about 1.95 inches and a radial depth of about 0.009 inches, and wherein the spherical mount has a preload of about 0.002 inches.

13. The bearing assembly of claim 11, wherein the foil bearing is a foil air bearing, and wherein an interior of at least one end of the bearing includes a retainer ring substantially adjacent a plurality of segmented snubbers.

14. The bearing assembly of claim 13, wherein seven curved spring bars substantially encircle the circumferential exterior portion of the foil bearing.

15. The bearing assembly of claim 13, wherein the spring bars each have a width along the axis, and wherein the spherically contoured protrusion of each spring bar extends across the width of the spring bar.

16. A gas turbine engine bearing assembly for use with a shaft rotating around an axis, comprising a substantially cylindrical foil bearing, wherein a circumferential exterior portion of the foil bearing is within a substantially circular array of curved spring bars, each spring bar including an external spherically contoured protrusion; and
    a bearing housing, wherein the spherically contoured protrusion is a self-aligning mount, and wherein the spherical mount is preloaded within the bearing housing, and further wherein the foil bearing is a foil air bearing, and wherein an interior of at least one end of the bearing includes a retainer ring substantially adjacent a plurality of segmented snubbers.

17. The bearing assembly of claim 16, wherein seven curved spring bars substantially encircle the circumferential exterior portion of the foil bearing.

18. The bearing assembly of claim 16, wherein the spring bars each have a width along the axis, and wherein the spherically contoured protrusion of each spring bar extends across the width of the spring bar.

* * * * *